Patented Sept. 17, 1929

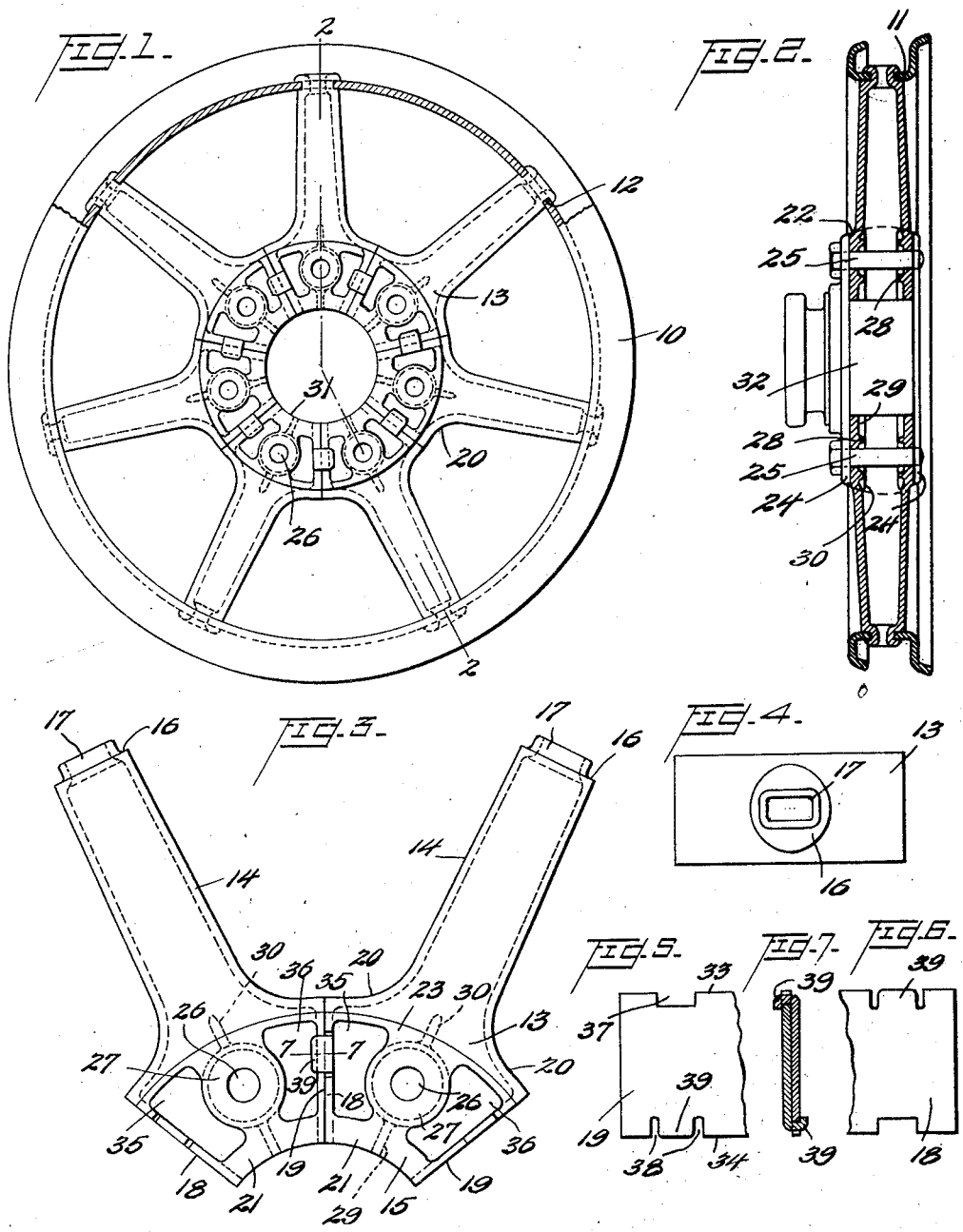

1,728,428

UNITED STATES PATENT OFFICE

ALEXANDER MELDRUM, OF SYRACUSE, NEW YORK, ASSIGNOR, BY MESNE ASSIGNMENTS, TO HURLBURT W. SMITH AND WILBERT L. SMITH, BOTH OF SYRACUSE, NEW YORK

SPOKE FOR VEHICLE WHEELS

Application filed February 15, 1926. Serial No. 88,452.

This invention relates to vehicle wheels and more particularly to metal vehicle wheels adapted for automotive vehicles.

It is a general object of the present invention to provide an all-metal spoked wheel.

More particularly it is an object of the present invention to provide a wheel formed of a metal felloe, and metal spokes having inner ends which form a central hub-like member.

Another object of the present invention consists in the provision of hollow cast metal spokes which can be assembled together with a felloe rim to form a complete wheel, means being provided on each spoke to interlock it with the adjoining spokes.

A still further object of the present invention consists in the provision of novel means for interlocking the inner adjoining ends of metal spokes and for securing their outer ends to a felloe.

Wheels for automotive vehicles may be divided generally into two classes, first those which contain a considerable portion of wood in their structure, particularly the spokes, and second those which are all metal. Of the latter class there are several types, including disc wheels, one piece cast wheels, wheels in which the hub, spoke and felloe are formed as cast sectors bolted, riveted or otherwise secured together, and so on. The present invention contemplates the provision of a wheel in which a single pressed metal felloe is arranged to receive the tenoned ends of hollow cast metal spokes, each spoke having at its inner end a sector-like hub forming portion so that when the radial faces of these sector-like portions are placed adjacent to each other they form a complete inner ring or hub which is adapted to receive side plates for a finish and an inner bearing member or secondary hub.

The invention may best be understood by reference to the accompanying drawing and following specification, wherein is disclosed a single exemplary embodiment of the invention with the understanding, however, that various changes may be made therein by those skilled in the art without departing from the spirit of the invention or the scope of the appended claims.

In said drawing:

Figure 1 is a side elevation of a wheel constructed according to the present invention, a portion of the felloe being broken away to more clearly disclose the method of fastening the spoke ends therein;

Figure 2 is a transverse section on line 2—2 of Fig. 1;

Figure 3 is a side elevation of two of the spokes on an enlarged scale showing the manner of securing their sector-like ends together;

Figure 4 is an end view of one of the spokes looking from the tenoned end;

Figure 5 is a partial elevation of the radial face of the sector portion of one of the spokes;

Figure 6 is a similar view of the abutting face on the adjoining spoke; and

Figure 7 is a section on line 7—7 of Fig. 3.

Referring to the drawing, there is disclosed at 10 a pressed metal felloe of the construction adapted for use with a demountable rim, although it will be obvious that any form of felloe may be used. This felloe is preferably rolled from a single piece of sheet steel or similar metal to substantially a channel-like form, having its inner face or web 11 substantially cylindrical and provided with perforations 12 to receive the tenoned ends of the spokes 13.

Any suitable number of spokes may be used in accordance with the desired strength and appearance of the wheel. In the drawing seven have been shown by way of illustration. Each spoke consists primarily of two parts, the tubular outer end portion 14 and the inner sector-like hub-forming portion 15. The spokes are preferably formed hollow and constructed by casting from any suitable metal having sufficient malleability for the purposes to be later described. The outer tubular end has thin walls and is of any suitable transverse cross section such as circular, elliptical or otherwise, and may or may not taper from the hub outward. Each spoke is reduced in diameter at its end to form a shoulder 16 which abuts against the inner cylindrical face of the felloe and supports it against inward movement. The reduced portion or tenon 17 beyond the shoulder is likewise hollow or tubular and is of some non-circular transverse section, shown in the drawing as substantially rectangular. This tenon portion is formed non-circular in order that there can be no rotation of the spoke about its axis in respect to the felloe during assembly and therefore the perforations 12 in the felloe are of a corresponding configuration. When the spokes are positioned in the felloe as shown in Fig. 1 the ends of the tenons 17 project beyond the outer face of the felloe web and are suitably formed over to retain them in position, as by rolling, swaging or staking, thus insuring a rigid connection between the spokes and the felloe.

The inner end of each spoke is sector-like in shape and integral with the tubular portion 14. It has a pair of radial plates 18 and 19 each of which is adapted to abut against the corresponding plate on the adjacent spoke when the spokes are assembled to form a wheel. These plates are connected by the fillet portions 20 with the tubular part of the hub to form, not only a pleasing outline, but a complete closure of the hub part. Side members 21 connect the plates together at their ends at either side of the wheel and short radius fillets 22 lead from the tubular portions of the spoke and from the fillets 20 to form the parts 23 which join the other ends of the plates 18 and 19 together. The parts 21 and 23 are of thickened section so that when the spokes are assembled they form a plane radial surface on either side of the hub adapted to receive the finishing discs 24 which are secured on opposite sides of the hub portion by means of the bolts 25 which pass through apertures 26 in the side members of each spoke. These apertures are surrounded by rings of metal 27 connected to the parts 21 and 23, which are outlined on their inner surfaces by the reinforcing ribs or bosses 28. These reinforcing ribs or bosses join the radial ribs 29 and 30 the former of which leads to the inner end of the spoke and the latter, part way into the tubular portion of the spoke for strengthening purposes. The inner ends of the spokes are open, as best shown in Fig. 2 and arcuate in form so that when all the spokes are arranged within the felloe an opening 31 is left for the bearing member or secondary hub 32 which may or may not be secured to one of the plates 24. In case it is not secured to the plates it is held in position by them in any suitable manner.

In order to hold the spokes securely in position without relying too much on the side plates 24 and to prevent the wheel from "dishing", means are provided to lock each spoke to the adjacent spokes at the hub. For this purpose the plates 18 and 19 have free edges 33 and 34 between the parts 21 and 23 provided by the cut-out portions 35 and 36, which assist in lightening the spoke. The free edge 33 of the plate 19 is provided with a notch 37 and the opposite edge 34 is provided with a pair of slits 38 to define the tongue 39. The edge of plate 18 is provided with a corresponding notch and tongue but in a reverse position as shown in Figs. 5 and 6 so that when a pair of plates 18 and 19 on adjoining spokes are abutted together the tongue on each plate may be bent into the notch on the adjacent plate as best shown in Fig. 7 to thus form a very rigid connection between the two adjoining spokes.

It is to be understood that the spokes are formed of metal which is sufficiently malleable to allow the tenons to be swaged over and the tongues bent as just described. The wheel is assembled by placing a spoke tenon in each of the openings 11, and here it should be noted that the non-circular arrangement of these openings and tenons insures the spokes of a proper positioning when they are first assembled and prevents any rotation during the assembly. The inner sector-like ends are then arranged adjacent to each other and in a dished form and pressure applied to force them into the central plane of the wheel thus insuring a tight fit between the plates 18 and 19 and forcing the shoulders 16 tightly against the inner surface of the felloe. The tongues by their interlocking engagement with the notches in the adjacent spokes absolutely prevent any relative radial movements between the spokes. This feature is of extreme importance particularly in a wheel of the present construction containing a small number of spokes. When the spokes are arranged in a pyramided or dished form and are being forced into position by pressure axially of the wheel there is a tendency, due to the tapered hub ends of the spokes, to force some of them outwardly more than others and thus distort the felloe and destroy its true circular form. The tongues in the notches absolutely prevent this. At the same time the non-circular configuration of the tenons prevents any positive rotation of any spoke during the assembling and pressing operation and thus increases the ease with which the wheel can be assembled. It is to be noted that the tongues 39 do not project beyond the faces of the spokes to interfere with any means used to press the the spokes into position. After the wheel has thus been assembled, the tongues 39 are all bent over into the notches 37 and their ends are bent still further around the metal of the adjacent plate which contains the notch, thus forming a wheel which is extremely rigid and insuring against a collapse of the wheel resulting from an accident to the car on which it may be used. The spokes are of such thinness that the complete wheel weighs no more than a corresponding wood wheel of the same size, but the strength of the wheel is from two to three times as great as that of a wooden spoke wheel.

It is desired that the invention be not limited to the exact means of securing the spokes together, for it is obvious that they could be secured together by riveting, welding or forcing pieces over the edges of the plates 18 and 19. However, the present method eliminates any loose parts or the handling of the same, and insures that upon the initial assembly of the wheel all parts will be in readiness for the final securing together of the spokes.

Having thus described the invention, what is claimed as new and desired to be secured by Letters Patent is:

A metal spoke for wheels including a tubular radial portion and an integral, sector-like, hub-forming portion, radial plate members forming faces of said hub portion and adapted to abut similar faces on adjacent spokes when formed into a wheel, the lateral edges of each plate member being free, one lateral edge of each plate having a notch therein and the other lateral edge having spaced slits defining a tongue, said notches and tongues being so positioned that when the plates of adjoining spokes are abutted the tongues on each plate may be bent into the notches of the other.

In testimony whereof I hereunto affix my signature.

ALEXANDER MELDRUM.